(12) United States Patent  
Kishimoto et al.

(10) Patent No.: US 12,451,492 B2  
(45) Date of Patent: Oct. 21, 2025

(54) PRODUCING METHOD FOR POSITIVE ELECTRODE PLATE

(71) Applicants: Prime Planet Energy & Solutions, Inc., Tokyo (JP); PRIMEARTH EV ENERGY CO., LTD., Shizuoka-ken (JP); TOYOTA JIDOSHA KABUSHIKI KAISHA, Aichi-ken (JP)

(72) Inventors: Naoya Kishimoto, Nagoya (JP); Shotaro Deguchi, Toyohashi (JP)

(73) Assignees: PRIME PLANET ENERGY & SOLUTIONS, INC., Tokyo (JP); TOYOTA BATTERY CO., LTD., Shizuoka-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 469 days.

(21) Appl. No.: 18/185,373

(22) Filed: Mar. 17, 2023

(65) Prior Publication Data

US 2023/0343967 A1     Oct. 26, 2023

(30) Foreign Application Priority Data

Apr. 20, 2022   (JP) ................... 2022-069617

(51) Int. Cl.  
*H01M 4/04*     (2006.01)  
*H01M 4/1393*   (2010.01)  
(Continued)

(52) U.S. Cl.  
CPC ......... *H01M 4/666* (2013.01); *H01M 4/1393* (2013.01); *H01M 4/667* (2013.01); *H01M 2004/028* (2013.01)

(58) Field of Classification Search  
CPC .......................... H01M 4/625; H01M 4/0416  
See application file for complete search history.

(56) References Cited

U.S. PATENT DOCUMENTS

2020/0058930 A1*   2/2020   Otohata ............. H01M 4/0404  
2023/0327083 A1*  10/2023   Lai ....................... H01M 4/505  
                                                               429/217

FOREIGN PATENT DOCUMENTS

JP      2019185943 A  * 10/2019  
JP      2020-184490 A   11/2020  
(Continued)

OTHER PUBLICATIONS

Machine Translation of JP 2019185943 A from Espacenet (Year: 2019).*

*Primary Examiner* — Nicholas A Smith  
*Assistant Examiner* — Zackary Richard Cochenour  
(74) *Attorney, Agent, or Firm* — HAUPTMAN HAM, LLP

(57) ABSTRACT

A producing method for a positive electrode plate includes a positive electrode paste preparing process of preparing a positive electrode paste including carbon nanotubes, positive active material particles, and a solvent, a coating process of coating the positive electrode paste on a surface of a current collector to form a positive electrode paste layer on the surface of the current collector, and a drying process of drying the positive electrode paste layer to form a positive electrode mixture layer. The carbon nanotubes have the characteristics of being attracted by magnets, and the carbon nanotubes included in the positive electrode paste layer are attracted toward a side of the current collector by the magnets at least any one of directly before the drying process or during the drying process.

3 Claims, 10 Drawing Sheets

(51) Int. Cl.
*H01M 4/66* (2006.01)
*H01M 4/02* (2006.01)

(56) References Cited

FOREIGN PATENT DOCUMENTS

| | | |
|---|---|---|
| JP | 2022-55888 A | 4/2022 |
| JP | 2022-55890 A | 4/2022 |

\* cited by examiner

PRODUCING METHOD FOR POSITIVE ELECTRODE PLATE

CROSS-REFERENCE TO RELATED APPLICATIONS

This application is based upon and claims the benefit of priority from the prior Japanese Patent Application No. 2022-069617 filed on Apr. 20, 2022, the entire contents of which are incorporated herein by reference.

BACKGROUND

Technical Field

The present disclosure relates to a producing method for a positive electrode plate.

Related Art

The Japanese patent application publication No. JP2020-184490A has disclosed a producing method for a positive electrode plate including a positive electrode mixture layer placed on a surface of a current collector. Specifically, this producing method includes a positive electrode paste preparing process of preparing a positive electrode paste including carbon nanotubes, positive active material particles, and a solvent, a coating process of coating the positive electrode paste on the surface of the current collector to form a positive electrode paste layer on the surface of the current collector, and a drying process of drying the positive electrode paste layer to form the positive electrode mixture layer.

SUMMARY

Technical Problems

Additionally, when the positive electrode paste including the carbon nanotubes, the positive active material particles, and the solvent is coated on the surface of the current collector to form the positive electrode paste layer and this positive electrode paste layer is dried, there is a case that a part of the carbon nanotubes disposed on a side of a current collector inside the positive electrode paste layer moves to a side of the surface of the positive electrode paste layer with the solvent (to a side far away from the current collector), which results in reduction in an amount of the carbon nanotubes on the current collector side. The carbon nanotube is lighter in its weight than the positive active material particle, and therefore the carbon nanotubes tend to move to the surface side of the positive electrode paste layer with the solvent that is to be evaporated. As a result of this, inside the positive electrode mixture layer which is formed by drying the positive electrode paste layer, reduction in conductive paths on the current collector side causes increase in the electrical resistivity of the positive electrode plate in a thickwise direction, which could cause degradation in the current collecting performance of the positive electrode plate.

The present disclosure has been made in view of the above circumstances, and has a purpose of providing a producing method for the positive electrode plate which has low electrical resistivity in the thickwise direction.

Means of Solving the Problem (1) One aspect of the present disclosure is a producing method for a positive electrode plate comprising a positive electrode mixture layer on a surface of a current collector includes: positive-electrode-paste preparing of preparing a positive electrode paste including carbon nanotubes, positive active material particles, and a solvent; coating of coating the positive electrode paste on the surface of the current collector to form a positive electrode paste layer on the surface of the current collector; and drying of drying the positive electrode paste layer to form the positive electrode mixture layer, wherein the carbon nanotubes have the characteristics of being attracted by a magnet, and the magnet attracts the carbon nanotubes included in the positive electrode paster layer toward a side of the current collector at least any one of directly before the drying and during the drying.

In the above producing method, as the carbon nanotubes, a carbon nanotube having the characteristics of being attracted by a magnet is used. At least any one time of directly before the drying of drying the positive electrode paste layer that has been coated on the surface of the current collector and during the drying, the carbon nanotubes included in the positive electrode paste layer is attracted toward the current collector side by the magnet. Thus, it is possible to draw or attract the carbon nanotubes toward the current collector side directly before the drying or to attract the carbon nanotubes, which tend to move toward the surface side with the solvent toward the current collector side during the drying. Thereby, the carbon nanotubes are difficult to move toward the surface side. Therefore, when the positive electrode paste layer is dried in the drying, the carbon nanotubes placed on the current collector side inside the positive electrode paste layer, especially the carbon nanotubes contacted with the current collectors, can be prevented from moving toward the surface side (that is, a side far away from the current collector) with the solvent and thus prevented from relatively decreasing.

Therefore, according to the above producing method, in the positive electrode mixture layer that has been formed by drying the positive electrode paste layer, decrease in conductive paths on the current collector side can be prevented. Thereby, increase in the electrical resistivity in a thickwise direction of the positive electrode plate can be prevented, so that degradation in the current collecting performance of the positive electrode plate can be restrained. According to the above producing method, therefore, a positive electrode plate having the low electrical resistivity ($\Omega\cdot$cm) in the thickwise direction can be produced.

As carbon nanotubes having the characteristics of being attracted by a magnet, for example, a carbon nanotube having magnetic substance inside or on a surface thereof may be exemplified. Specifically, carbon nanotubes having magnetic substance made of metal such as Co and Fe which are included as impurities in the carbon nanotubes in a process of producing the carbon nanotubes may be exemplified.

(2) Further, in the producing method for the positive electrode plate in the above (1), preferably, the carbon nanotubes comprise first carbon nanotubes and second carbon nanotubes, an average length of which is shorter than an average length of the first carbon nanotubes, the positive-electrode-paste preparing is to prepare a first positive electrode paste including the first carbon nanotubes as the carbon nanotubes and a second positive electrode paste including the second carbon nanotubes as the carbon nanotubes, the coating includes: first coating of coating the first positive electrode paste on the surface of the current collector to form a first positive electrode paste layer on the surface of the current collector; and second coating of coating the second positive electrode paste on any one of a surface of the first positive electrode paste layer and a surface of a first positive electrode mixture layer, which is formed by drying the first positive electrode paste layer, to form a second positive electrode paste layer, and attracting by the magnet is performed at least any one of before drying the first positive electrode paste layer in the drying and during drying the first positive electrode paste layer in the drying.

In the above producing method, at least any one of before drying the first positive electrode paste layer in the drying and during drying the first positive electrode paste layer in the drying, the above-mentioned attraction by the magnet is performed. Thus, when the first positive electrode paste layer is dried in the drying, the first carbon nanotubes placed on the current collector side, especially the first carbon nanotubes contacted with the current collector inside the first positive electrode paste layer, which has been formed on the surface of the current collector, can be prevented from moving toward the surface side (that is, a side far away from the current collector) with the solvent and thus prevented from relatively decreasing.

Further, the average length of the first carbon nanotubes (hereinafter, referred as first CNTs) included in the first positive electrode paste is arranged to be longer than the average length of the second carbon nanotubes (hereinafter, referred as second CNTs) included in the second positive electrode paste. Thus, when the first positive electrode paste layer is dried, the first CNTs placed on the current collector side in the first positive electrode paster layer are further difficult to move toward the surface side (that is, the side far away from the current collector) with the solvent, so that the first CNTs positioned on the current collector side, especially the ones contacted with the current collector, are further hard to decrease.

This is because when the first positive electrode paste layer is dried, the first CNTs in the first positive electrode paste layer tend to move toward the surface side with the solvent, but the first CNTs are easily caught up by the positive active material particles due to their long length, and thereby the carbon nanotubes are hard to move toward the surface side owing to this catching by the positive active material particles. Therefore, according to the above producing method, a positive electrode plate having lower electrical resistivity in the thickwise direction can be produced.

The above producing method includes either one of the following processes of (a) or (b). (a) After the first positive electrode paste is coated on the surface of the current collector to form the first positive electrode paste layer on the surface of the current collector in the first coating, the second positive electrode paste is coated on the surface of the first positive electrode paste layer to form the second positive electrode paste layer in the second coating. Thereafter, in the drying, the first positive electrode paste layer is dried with the second positive electrode paste layer. In a case of this producing method, at least any one of directly before the drying to dry the first positive electrode paste layer with the second positive electrode paste layer and during the drying, the above-mentioned attraction by the magnet is performed.

(b) After the first positive electrode paste is coated on the surface of the current collector and the first positive electrode paste layer is formed on the surface of the current collector in the first coating, the step of the first drying (the drying) is performed to dry the first positive electrode paste layer to form the first positive electrode mixture layer. Subsequently, the second positive electrode paste is coated on the surface of the first positive electrode mixture layer and the second positive electrode paste layer is formed in the second coating, and then the step of the second drying (the drying) is performed to dry the second positive electrode paste layer. In a case of this producing method, at least any one of directly before the first drying to dry the first positive electrode paste layer and during the first drying, the above-mentioned attraction by the magnet is performed. Furthermore, also at least any one of directly before the second drying to dry the second positive electrode paste layer and during the second drying, the above-mentioned attraction by the magnet may be performed.

(3) Further, in the producing method for the positive electrode plate according to the above (2), preferably, the second coating is to coat the second positive electrode paste on the surface of the first positive electrode paste layer to form the second positive electrode paste layer, and the drying is to dry the first positive electrode paste layer with the second positive electrode paste layer to form the positive electrode mixture layer after the second coating.

In the above producing method, the second positive electrode paste is coated on the surface of the first positive electrode paste layer before drying in the second coating, and thereafter, the second positive electrode paste layer is dried with the first positive electrode paste layer during the process of the drying. Namely, this is the producing method according to the above (a). Thus, in comparison with a case of "drying the first positive electrode paste layer to form the first positive electrode mixture layer before coating the second positive electrode paste, and then drying the second positive electrode paste layer that has been coated on the surface of the first positive electrode mixture layer," namely, the producing method according to the above (b), the electrical resistivity of the positive electrode plate in the thickwise direction can be lowered furthermore.

The reason for the above is explained below. According to the latter producing method, when the second positive electrode paste layer is dried, a part of the second CNTs positioned on the current collector side in the second positive electrode paste layer moves to the surface side with the solvent, so that there is a possibility that the number of the second CNTs on the current collector side could be reduced in the second positive electrode paste layer. In the latter producing method, at the time when the second positive electrode paste layer is to be dried, the first positive electrode paste layer has already been dried to become the first positive electrode mixture layer, and thus the first CNTs in the first positive electrode mixture layer do not move to the second positive electrode paste layer.

On the other hand, in the former producing method, the second positive electrode paste layer is dried with the first positive electrode paste layer, and accordingly, in drying these layers, a part of the second CNTs positioned on the current collector side in the second positive electrode paste layer moves to the surface side with the solvent. Thereby, the second CNTs on the current collector side in the second positive electrode paste layer could be reduced. On the other hand, a part of the first CNTs positioned on the surface side in the first positive electrode paste layer moves to the surface side with the solvent, so that the part of the first CNTs may be disposed on the current collector side in the second positive electrode paste layer or may be disposed to bridge over the surface side of the first positive electrode paste layer and the current collector side of the second positive electrode paste layer. Thereby, the carbon nanotubes are disposed appropriately on the current collector side in the second positive electrode paste layer, and thus the electrical resistivity of the positive electrode plate in the thickwise direction can further be lowered.

(4) Alternatively, in the producing method for the positive electrode plate according to the above (2), preferably, the drying includes: first drying of drying the first positive electrode paste layer before the second coating to form the first positive electrode mixture layer; and second drying of drying the second positive electrode paste layer, which has been coated on the surface of the first positive electrode mixture layer, to form a second positive electrode mixture layer and to form the positive electrode mixture layer formed of the first positive electrode mixture layer and the second positive electrode mixture layer.

According to this producing method, the first positive electrode paste is coated on the surface of the current collector and the first positive electrode paste layer is formed on the surface of the current collector in the step of the first coating, and thereafter, the first drying (the drying) is performed to dry the first positive electrode paste layer to form the first positive electrode mixture layer. Thereafter, the second positive electrode paste is coated on the surface of the first positive electrode mixture layer and the second positive electrode paste layer is formed in the second coating, and subsequently, the step of the second drying (the drying) to dry this second positive electrode paste layer is performed. Namely, this corresponds to the producing method according to the above (b).

(5) Furthermore, in the producing method for the positive electrode plate according to the above (4), preferably, the attracting by the magnet is performed at least any one of directly before the first drying and during the first drying and performed at least any one of directly before the second drying and during the second drying.

In the above producing method, at least any one of directly before the first drying and during the first drying, the first CNTs included in the first positive electrode paste layer are attracted toward the current collector side by the magnets. Thus, when the first drying is performed to dry the first positive electrode paste layer, the first CNTs positioned on the current collector side, especially the ones contacted with the current collector in the first positive electrode paste layer formed on the surface of the current collector can be prevented from moving to the surface side (the side far away from the current collector) with the solvent and thus prevented from relatively decreasing.

Furthermore, at least any one of directly before the second drying and during the second drying, the second CNTs included in the second positive electrode paste layer are attracted toward the current collector side by the magnets. Thus, when the second drying is performed to dry the second positive electrode paste layer, the second CNTs positioned on the current collector side of the second positive electrode paste layer can be prevented from moving to the surface side (the side far away from the current collector) with the solvent and thus prevented from relatively decreasing. Thereby, the carbon nanotubes can be appropriately arranged throughout a thickwise direction of the positive electrode mixture layer, and thus the electrical resistivity in the thickwise direction of the positive electrode plate can be lowered.

DETAILED DESCRIPTION OF THE EXEMPLARY EMBODIMENTS

Example 1

Figure 1:
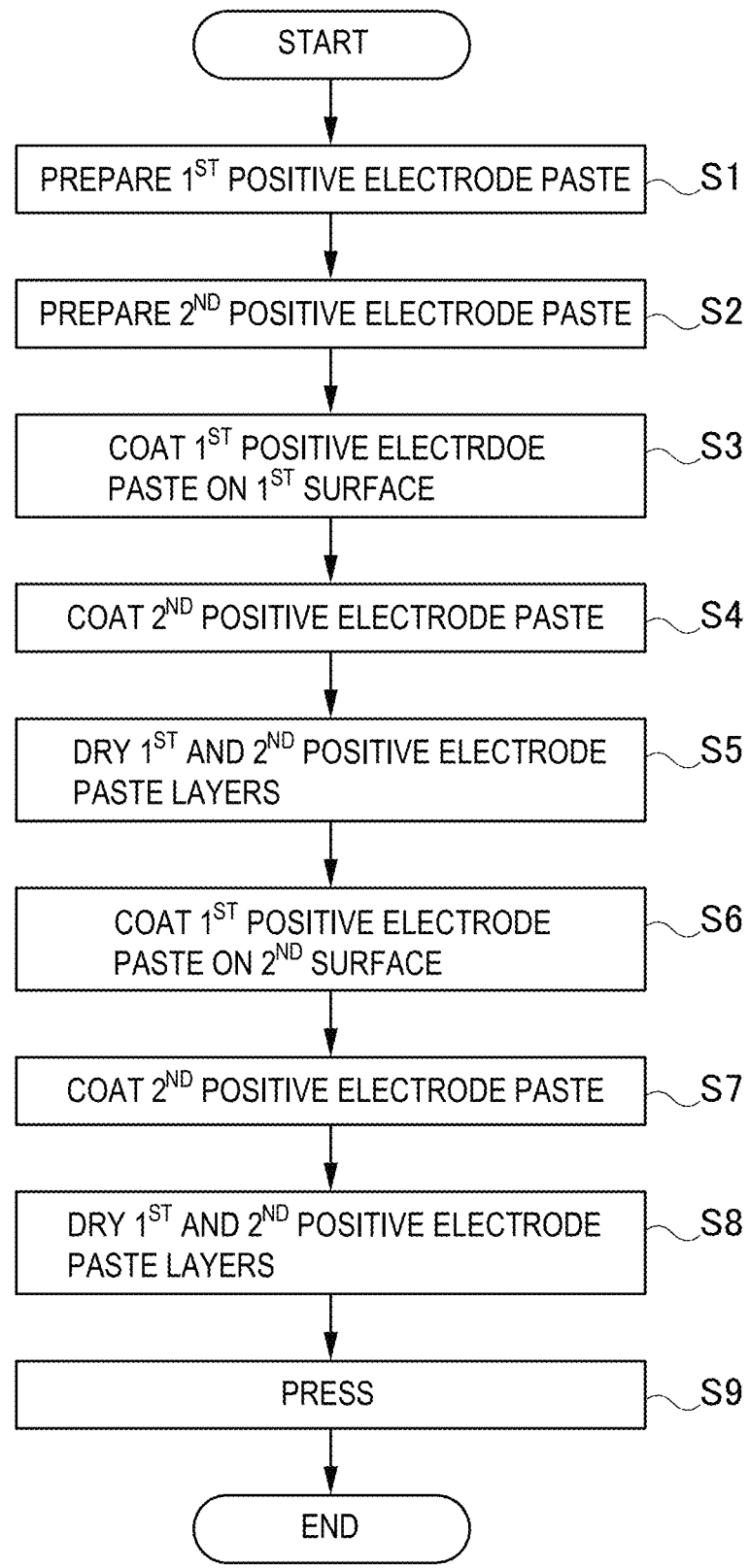
FIG. 1 is a flow chart indicating steps of a producing method for a positive electrode plate in an example 1.

A producing method for a positive electrode plate according to an example 1 is now explained. FIG. 1 is a flow chart indicating steps of the producing method for a positive electrode plate 1 according to the example 1. Firstly, in step S1 of a first positive electrode paste preparing process, a first positive electrode paste 41 including first carbon nanotubes (hereinafter, referred as first CNTs 11), positive active material particles 15, a binder (not shown), and a solvent 17 is prepared (see FIG. 2). The first positive electrode paste 41 includes only the first CNTs 11 as a carbon nanotube. Further, in step S2 of a second positive electrode paste preparing process, a second positive electrode paste 42 including second carbon nanotubes 12 (hereinafter, referred as second CNTs 12), the positive active material particles 15, the binder (not shown), and the solvent 17 is prepared (see FIG. 3). The second positive electrode paste 42 includes only the second CNTs as the carbon nanotube.

An average length of the first CNTs 11 is longer than an average length of the second CNTs 12. Specifically, the average length of the first CNTs 11 is 1.3 µm, and the average length of the second CNTs 12 is 0.6 µm. In detail, the length of the respective first CNTs 11 is arranged to be within a range of 1.0 µm to 3.0 µm inclusive while the length of the respective second CNTs 12 is arranged to be within a range of 0.3 µm to 0.8 µm inclusive.

Figure 4:
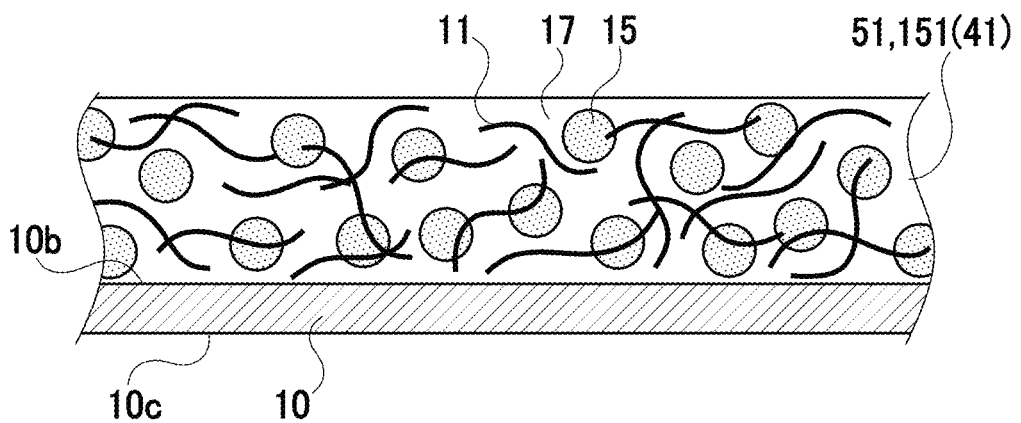
FIG. 4 is an explanatory view of a first coating process in the examples 1 and 2.
Figure 5:
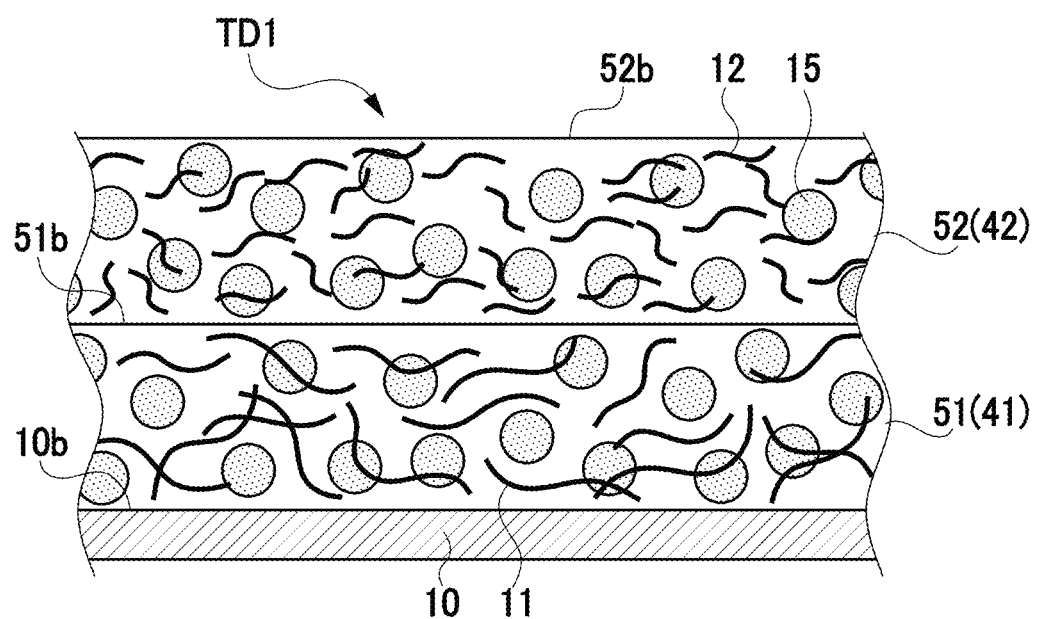
FIG. 5 is an explanatory view of a second coating process in the example 1.

Subsequently, in step S3 of a first coating process, the first positive electrode paste 41 is coated (applied) on a first surface 10b of a current collector 10 to form a first positive electrode paste layer 51 on the first surface 10b of the current collector 10 (see FIG. 4). In the present example 1, an aluminum foil having the first surface 10b and a second surface 10c is used as the current collector 10. Subsequently, the process proceeds to step S4 of a second coating process, and a second positive electrode paste 42 is coated (applied) on a surface 51b of the first positive electrode paste layer 51 to form a second positive electrode paste layer 52 (see FIG. 5). In this manner, a to-be-dried object TD1, which includes the first positive electrode paste layer 51 on the surface 10b of the current collector 10 and the second positive electrode paste layer 52 on the surface 51b of the first positive electrode paste layer 51, is produced.

Figure 6:
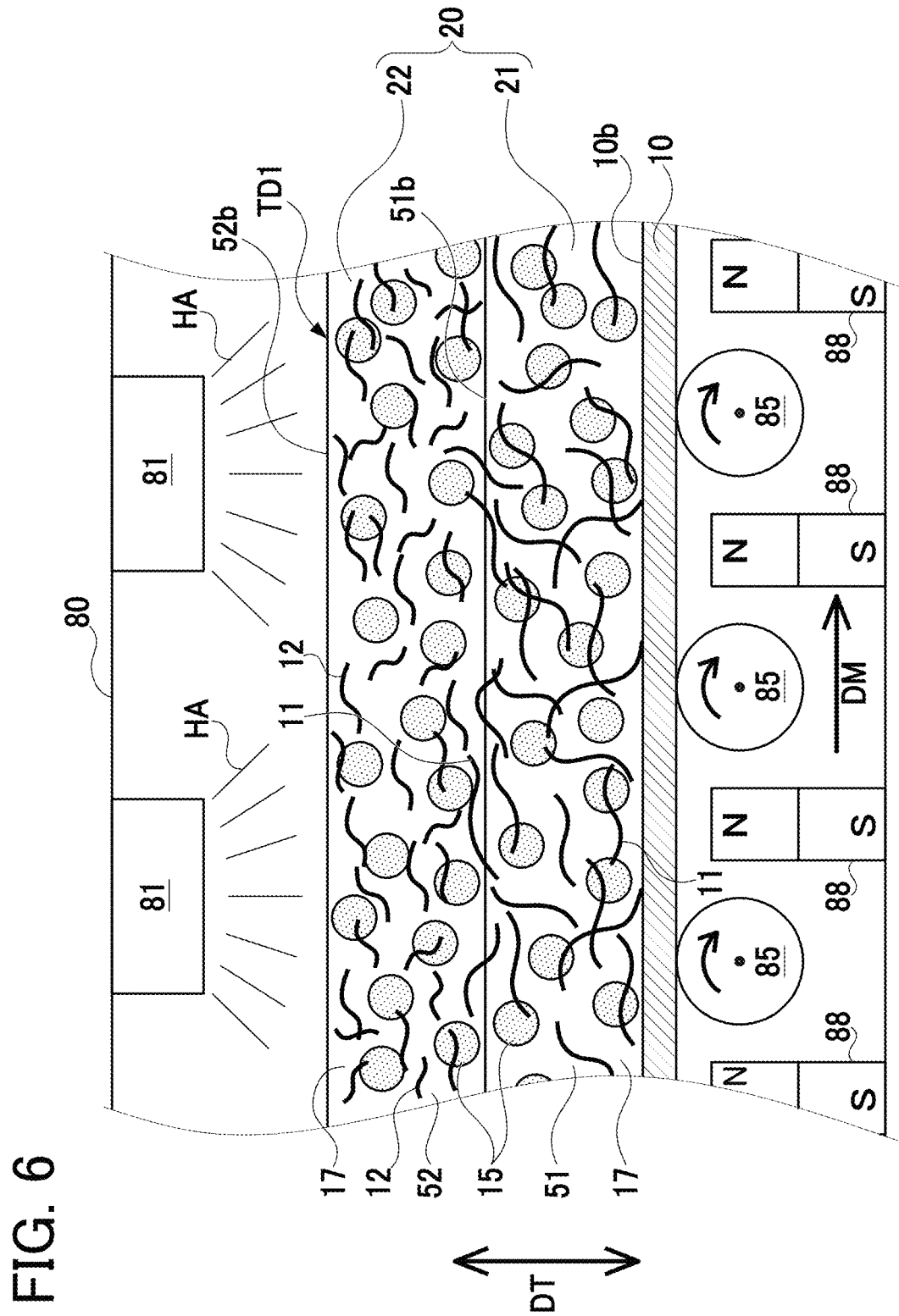
FIG. 6 is an explanatory view of a drying process in the example 1.

Thereafter, in step S5 of a drying process, the first positive electrode paste layer 51 is dried with the second positive electrode paste layer 52 to form a positive electrode mixture layer 20. Specifically, as shown in FIG. 6, the first positive electrode paste layer 51 and the second positive electrode paste layer 52 of the to-be-dried object TD1 are dried by a drying furnace 80 which is provided with a plurality of hot air blowers 81 placed on an upper side, a plurality of feeding rollers 85 placed on a lower side, and a plurality of magnets 88 placed below the to-be-dried object TD1 which is to be conveyed by the feeding rollers 85. To be more specific, in a state where the second positive electrode paste layer 52 is directed to a side of the hot air blowers 81 positioned on the upper side, the first positive electrode paste layer 51 and the second positive electrode paste layer 52 are dried by hot air HA blown out of the hot air blowers 81 while the to-be-dried object TD1 is being conveyed in a feeding direction DM by the feeding rollers 85.

At this time, the solvent 17 included in both the first positive electrode paste layer 51 and the second positive electrode paste layer 52 moves to the surface 52b of the second positive electrode paste layer 52 and is evaporated. As a result of this, the first positive electrode paste layer 51 becomes a first positive electrode mixture layer 21 and the second positive electrode paste layer 52 becomes a second positive electrode mixture layer 22. In this manner, a positive electrode mixture layer 20 formed of the first positive electrode mixture layer 21 and the second positive electrode mixture layer 22 is formed on the first surface 10b of the current collector 10.

Thereafter, on the second surface 10c of the current collector 10, too, the positive electrode mixture layer 20 formed of the first positive electrode mixture layer 21 and the second positive electrode mixture layer 22 is formed. To be specific, in step S6 of the first coating process, the first positive electrode paste 41 is coated on the second surface 10c of the current collector 10 to form the first positive electrode paste layer 51 on the second surface 10c of the current collector 10. Subsequently, the process proceeds to step S7 of the second coating process, and the second positive electrode paste 42 is coated on the surface 51b of the first positive electrode paste layer 51 to form the second positive electrode paste layer 52.

Figure 7:
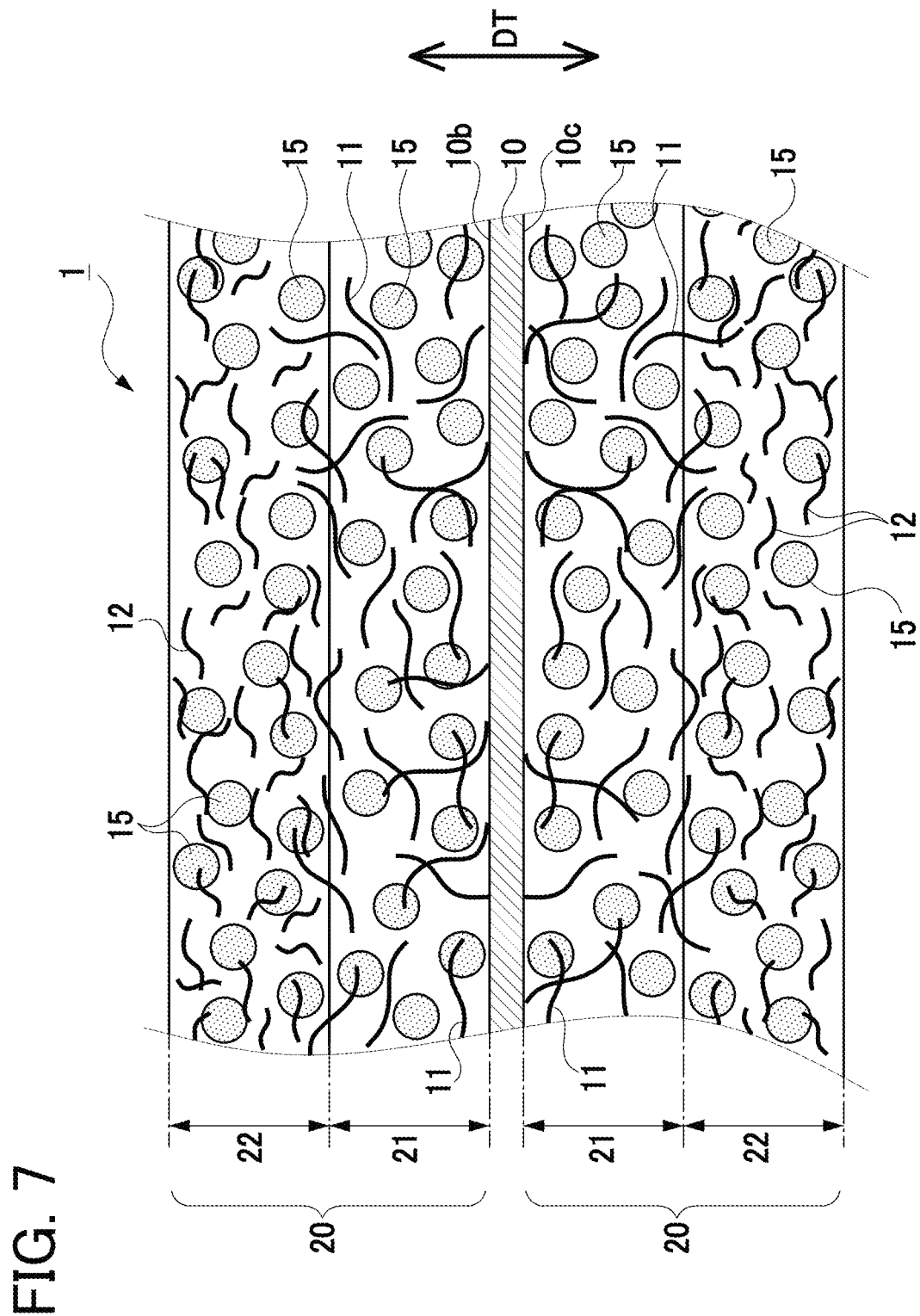
FIG. 7 is a schematic sectional view of the positive electrode plate in the example 1.

Subsequently, in step S8 of a drying process, the first positive electrode paste layer 51 is dried with the second positive electrode paste layer 52 by the drying furnace 80 to form the positive electrode mixture layer 20. At this time, the solvent 17 included in both the first positive electrode paste layer 51 and the second positive electrode paste layer 52 moves to the surface 52b of the second positive electrode paste layer 52 and is evaporated. As a result of this, the first positive electrode paste layer 51 becomes the first positive electrode mixture layer 21 and the second positive electrode paste layer 52 becomes the second positive electrode mixture layer 22, so that the positive electrode mixture layer 20 formed of the first positive electrode mixture layer 21 and the second positive electrode mixture layer 22 is also formed on the second surface 10c of the current collector 10 (see FIG. 7). Thereby, the positive electrode plate 1 (that is, the positive electrode plate 1 before pressing) provided with the positive electrode mixture layers 20 on both surfaces (that is, the first surface 10b and the second surface 10c) of the current collector 10 is obtained. Thereafter, in step S9 of a press process, the positive electrode plate 1 is pressed in the thickwise direction DT to compress the positive electrode mixture layers 20 in the thickwise direction DT, thus completing the positive electrode plate 1 (see FIG. 7).

Heretofore, there has been a case in which, when a positive electrode paste including carbon nanotubes (hereinafter, referred as CNTs), positive active material particles, and a solvent is coated on a surface of a current collector to form a positive electrode paste layer and this positive electrode paste layer is to be dried, a part of the CNTs positioned on a side of the current collector in the positive electrode paste layer moves to a side of the surface of the positive electrode paste layer (that is, a side far away from the current collector) with the solvent, which could cause reduction in an amount of the CNTs on the current collector side. This is because the CNTs are light in their weight as compared to the positive active material particles, and therefore the CNTs tend to move toward the surface side of the positive electrode paste layer with the solvent that is to be evaporated. Accordingly, the number of conductive paths on the current collector side decreases in the positive electrode mixture layer in which the positive electrode paste layer has been dried, causing increase in the electrical resistivity of the positive electrode plate in the thickwise direction. This could result in degradation in the current collecting performance of the positive electrode plate.

To address this, in the present example 1, CNTs having the characteristics of being attracted by the magnet 88 is used as the first CNTs 11 and the second CNTs 12. Further, during the drying process (that is, in each term of step S5 and step S8), the first CNTs 11 and the second CNTs 12 included in the positive electrode paste layer 51 and the second positive electrode paste layer 52, respectively, are attracted toward the current collector 10 side by the magnets 88 (see FIG. 6). Specifically, as shown in FIG. 6, while the first positive electrode paste layer 51 and the second positive electrode paste layer 52 of the to-be-dried object TD1 are being dried in the drying furnace 80, the first CNTs 11 and the second CNTs 12 included respectively in the first positive electrode paste layer 51 and the second positive electrode paste layer 52 are attracted or drawn toward the current collector 10 side (that is, the lower side in FIG. 6) by the magnets 88 positioned below the to-be-dried object TD1 which is being conveyed in the feeding direction DM inside the drying furnace 80. As the magnets 88, Samarium Cobalt magnets are used. Further, the magnetic flux density applied to the first positive electrode paste layer 51 and the second positive electrode paste layer 52 is arranged to be 1.0 T or more.

Accordingly, the first CNTs 11 and the second CNTs 12 are trying to move toward the surface 51b side and the surface 52b side with the solvent 17 during the drying process (that is, during the term of step S5 and step S8), but the first CNTs 11 and the second CNTs 12 are attracted toward the current collector 10 side so that the CNTs are difficult to move toward the surface 51b side and the surface 52b side. As a result of this, when the first positive electrode paste layer 51 and the second positive electrode paste layer 52 are to be dried in the drying process, the first CNTs 11 in the first positive electrode paste layer 51 and the second CNTs 12 in the second positive electrode paste layer 52 positioned on the current collector 10 side, especially the first CNTs 11 contacted with the current collector 10, are prevented from moving toward the surface 51b side and the surface 52b side (that is, the sides far away from the current collector 10) with the solvent 17 and thereby prevented from relatively decreasing.

Therefore, according to the producing method of the present example 1, it is possible to prevent reduction in the conductive paths on the current collector 10 side inside the positive electrode mixture layer 20 (that is, the first positive electrode mixture layer 21 and the second positive electrode mixture layer 22). Thereby, increase in the electrical resistivity of the positive electrode plate 1 in the thickwise direction DT can be prevented, so that degradation in the current collecting performance of the positive electrode plate 1 can be prevented. According to the producing method of the present example 1, therefore, it is possible to produce the positive electrode plate 1 having low electrical resistivity (Ω·cm) in the thickwise direction DT.

As the first CNTs 11 and the second CNTs 12 having the characteristics of being attracted by magnets, it is preferable to use first CNTs 11 and second CNTs 12 having magnetic substance inside or on a surface of the respective first CNTs 11 and the respective second CNTs 12. In the present example 1, as the first CNTs 11 and the second CNTs 12, CNTs having magnetic substance such as Co and Fe, which are included as impurities during a producing process of each of the first CNTs 11 and the second CNTs 12, are used. To be specific, the CNTs having 94% or less of purity are utilized as the first CNTs 11 and the second CNTs 12.

Furthermore, in the present example 1, the average length of the first CNTs 11 included in the first positive electrode paste 41 is arranged to be longer than the average length of the second CNTs 12 included in the second positive electrode paste 42. Thereby, in steps S5 and S8 of the drying process, the first CNTs 11 positioned on the current collector 10 side in the first positive electrode paste layer 51 are hard to move to the surface 51b side (that is, a side far away from the current collector 10 or the upper side in FIG. 6) with the solvent 17 while the first positive electrode paste layer 51 is being dried, so that the first CNTs 11 positioned on the current collector 10 side, especially the ones contacted with the current collector 10, are rarely reduced. The reason for this is explained below. When the first positive electrode paste layer 51 is to be dried, the first CNTs 11 in the first positive electrode paste layer 51 tend to move toward the surface 51b side and the surface 52b side with the to-be-evaporated solvent 17, but the first CNTs 11 having the long length are easily caught or hooked on the positive active material particles 15, and thereby the first CNTs 11 are hard to move to the surface 51b side and the surface 52b side owing to this catching by the positive active material particles 15.

Therefore, according to the producing method of the present example 1, it is possible to prevent decrease in the conductive paths on the current collector 10 side in the first positive electrode mixture layer 21 in which the first positive electrode paste layer 51 has been dried. Thereby, increase in the electrical resistivity of the positive electrode plate 1 in the thickwise direction DT can be further preferably prevented, so that degradation in the current collecting performance of the positive electrode plate 1 can further be prevented.

Example 2

In comparing with the producing method of the example 1, a producing method of an example 2 is different in a manner that a first positive electrode paste layer 151 is dried to form a first positive electrode mixture layer 121, and thereafter, a second positive electrode paste 42 is coated on a surface 121b of the first positive electrode mixture layer 121 while other configurations are same as the example 1.

Figure 8:
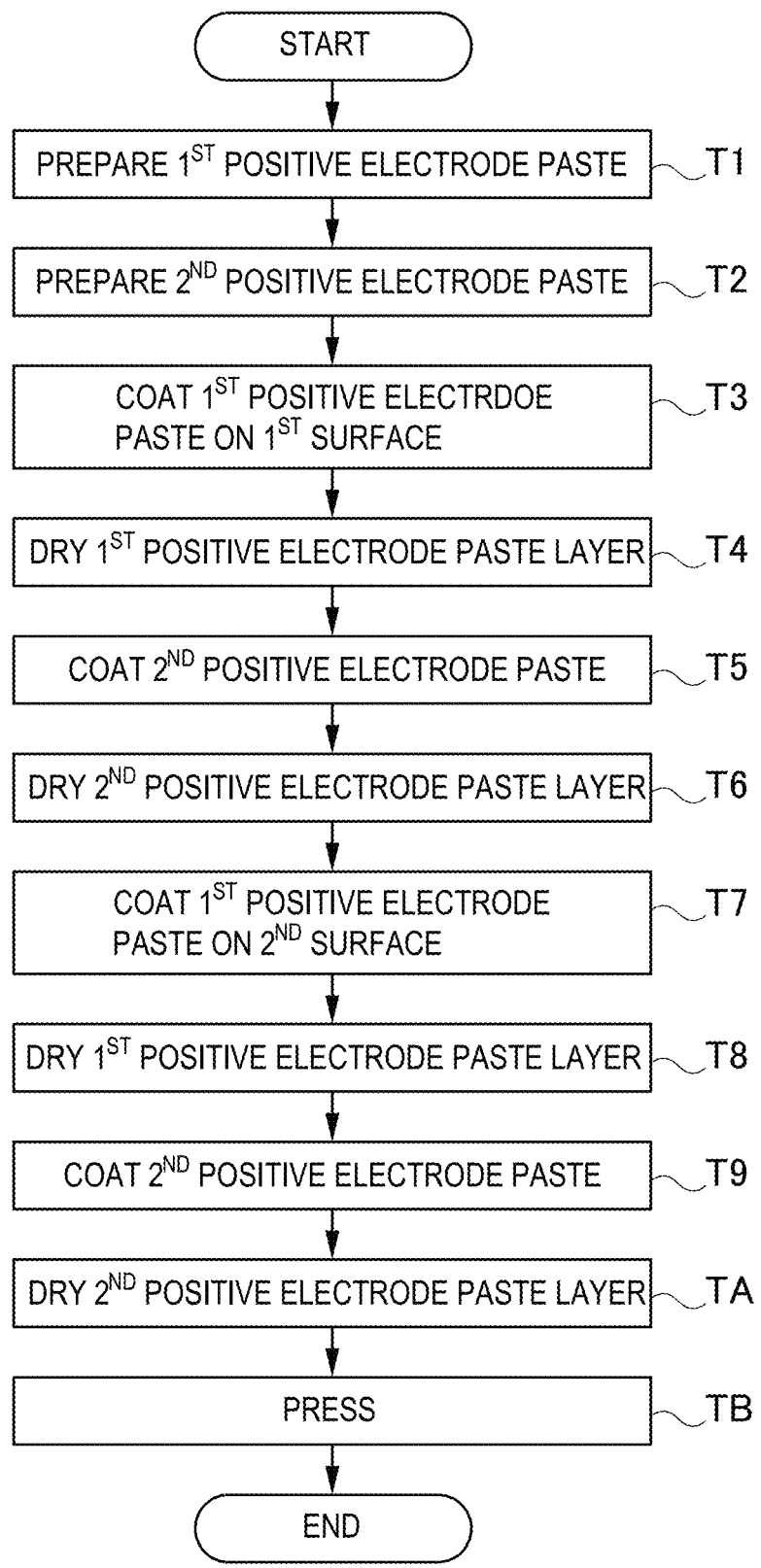
FIG. 8 is a flow chart indicating steps of the producing method for the positive electrode plate in the example 2.

The producing method for the positive electrode plate in the example 2 is explained below. FIG. 8 is a flow chart indicating steps of the producing method for a positive electrode plate 101 according to the example 2.

Figure 2:
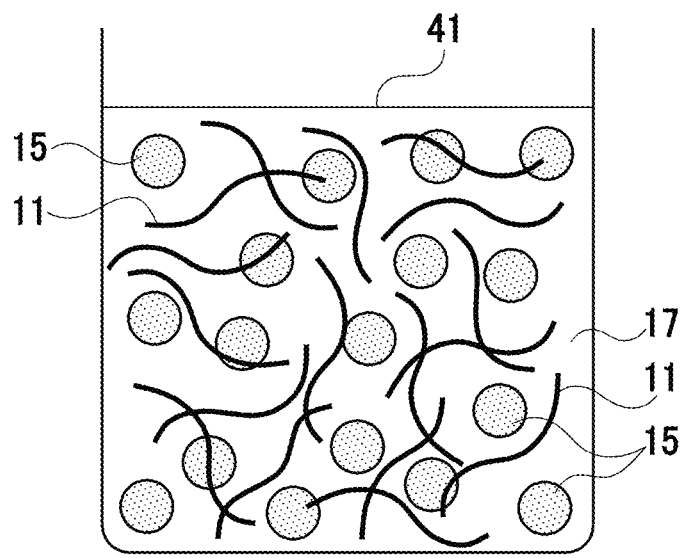
FIG. 2 is an explanatory view of a first positive electrode paste preparing process in examples 1 and 2.
Figure 3:
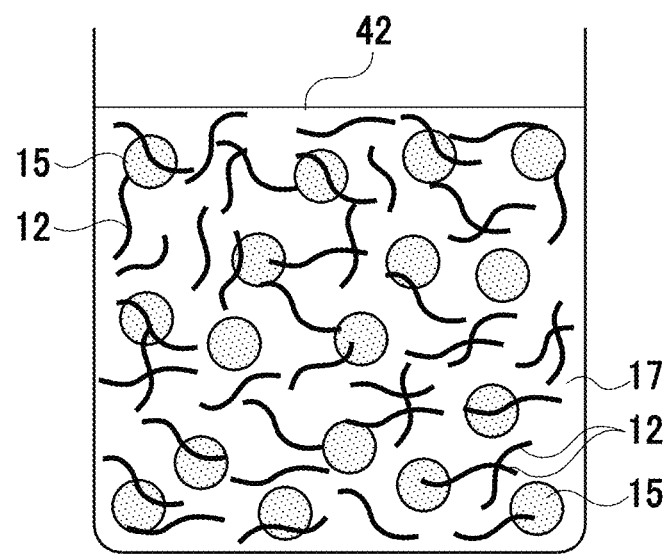
FIG. 3 is an explanatory view of a second positive electrode paste preparing process in the examples 1 and 2.

Firstly, in step T1 of a first positive electrode paste preparing process, the first positive electrode paste 41 similar to the one in the example 1 is prepared (see FIG. 2). Further, in step T2 of a second positive electrode paste preparing process, the second positive electrode paste 42 similar to the one in the example 1 is prepared (see FIG. 3). Subsequently, in step T3 of a first coating process, the first positive electrode paste 41 is coated or applied on the first surface 10b of the current collector 10 to form a first positive electrode paste layer 151 on the first surface 10b of the current collector 10 (see FIG. 4). Subsequently, in step T4 of a first drying, the first positive electrode paste layer 151 is dried by use of the drying furnace 80 to form a first positive electrode mixture layer 121 (see FIG. 9).

Figure 10:
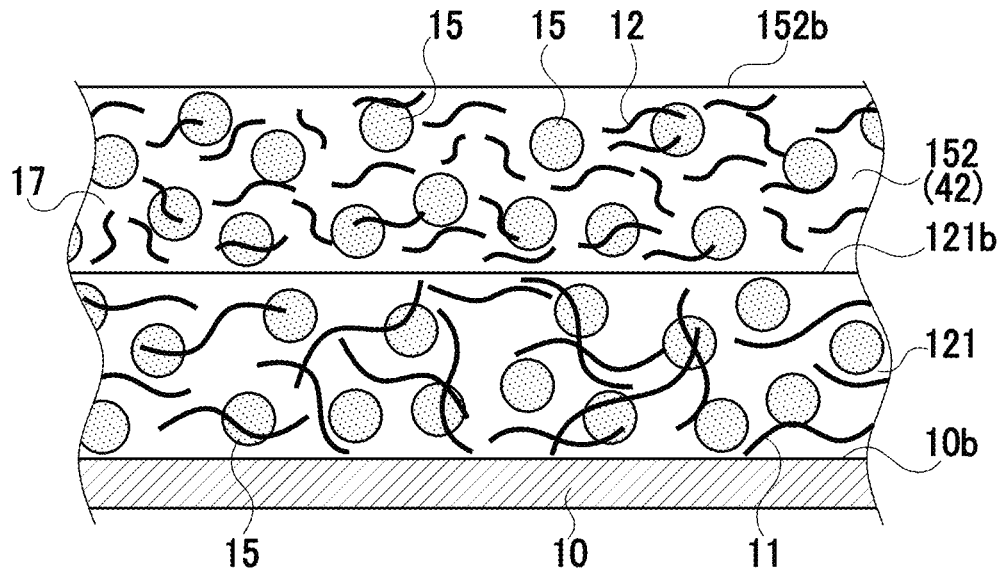
FIG. 10 is an explanatory view of the second coating process in the example 2.

After that, in step T5 of a second coating process, the second positive electrode paste 42 is coated or applied on a surface 121b of the first positive electrode mixture layer 121 to form a second positive electrode paste layer 152 (see FIG. 10). Subsequently, the process proceeds to step T6 of a second drying in which the second positive electrode paste layer 152 is dried by use of the drying furnace 80 to form a second positive electrode mixture layer 122. Thus, a positive electrode mixture layer 120 formed of the first positive electrode mixture layer 121 and the second positive electrode mixture layer 122 is formed on the first surface 10b of the current collector 10 (see FIG. 11).

Thereafter, on the second surface 10c of the current collector 10, too, the positive electrode mixture layer 120 formed of the first positive electrode mixture layer 121 and the second positive electrode mixture layer 122 is formed. To be specific, in step T7 of the first coating process, the first positive electrode paste 41 is coated on the second surface 10c of the current collector 10 to form the first positive electrode paste layer 151. Subsequently, the process proceeds to step T8 of the first drying, in which the first positive electrode paste layer 151 is dried to form the first positive electrode mixture layer 121. Thereafter, in step T9 of the second coating process, the second positive electrode paste 42 is coated on a surface 121b of the first positive electrode mixture layer 121 to form the second positive electrode paste layer 152.

Figure 12:
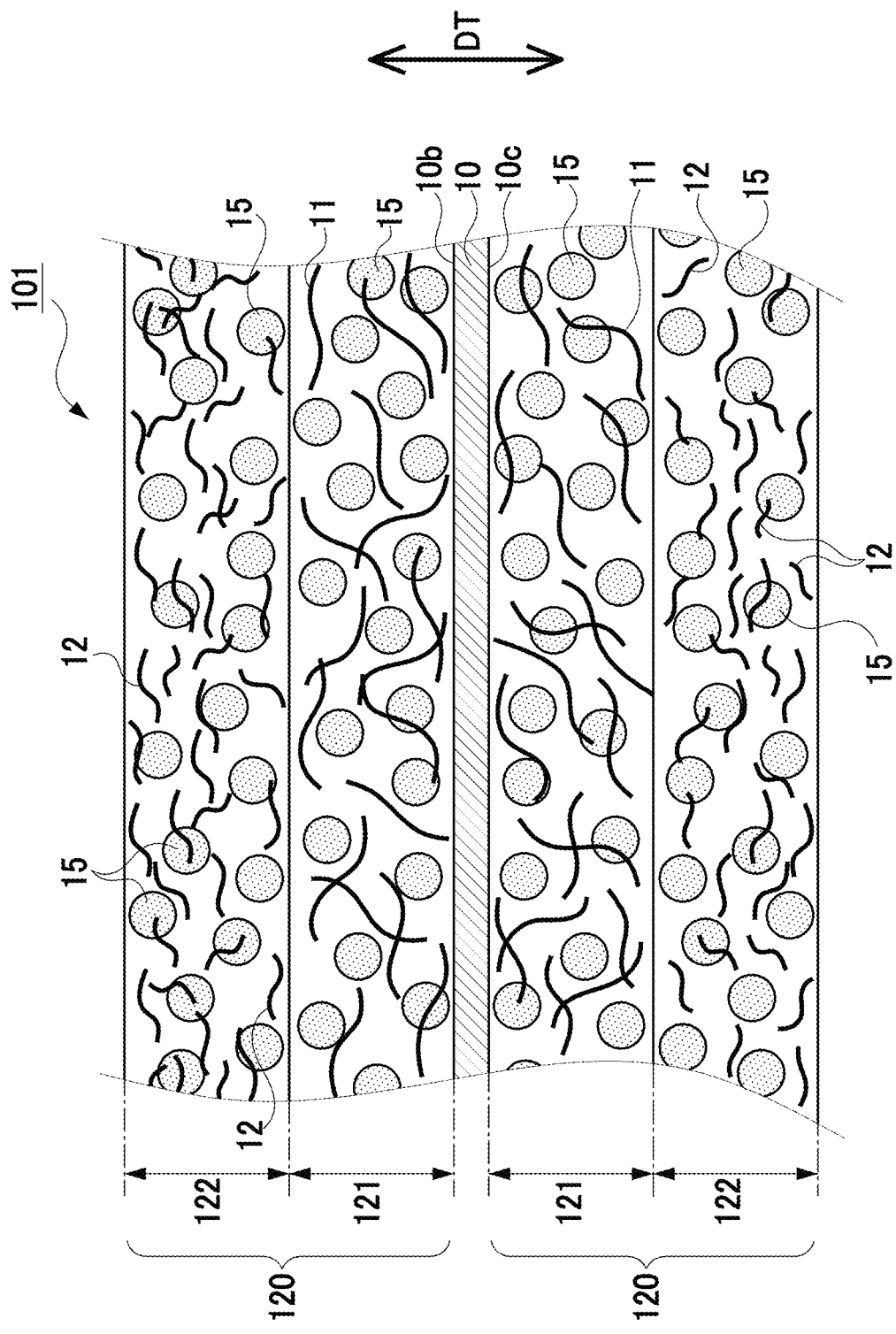
FIG. 12 is a schematic sectional view of the positive electrode plate in the example 2.

Subsequently, the process proceeds to step TA of the second drying, in which the second positive electrode paste layer 152 is dried to form the second positive electrode mixture layer 122. In this manner, the positive electrode mixture layer 120 formed of the first positive electrode mixture layer 121 and the second positive electrode mixture layer 122 is formed also on the second surface 10c of the current collector 10 (see FIG. 12). Accordingly, a positive electrode plate 101 (that is, the positive electrode plate 101 before pressing) provided with the positive electrode mixture layers 120 on both surfaces (that is, the first surface 10b and the second surface 10c) of the current collector 10 can be obtained. Thereafter, in step TB of a press process, the positive electrode plate 101 is pressed in the thickwise direction DT to compress the positive electrode mixture layers 120 in the thickwise direction DT, thus completing the positive electrode plate 101 (see FIG. 12). Herein, step T4 of the first drying, step T6 of the second drying, step T8 of the first drying, and step TA of the second drying in the present example 2 correspond to a process of the drying.

Figure 9:
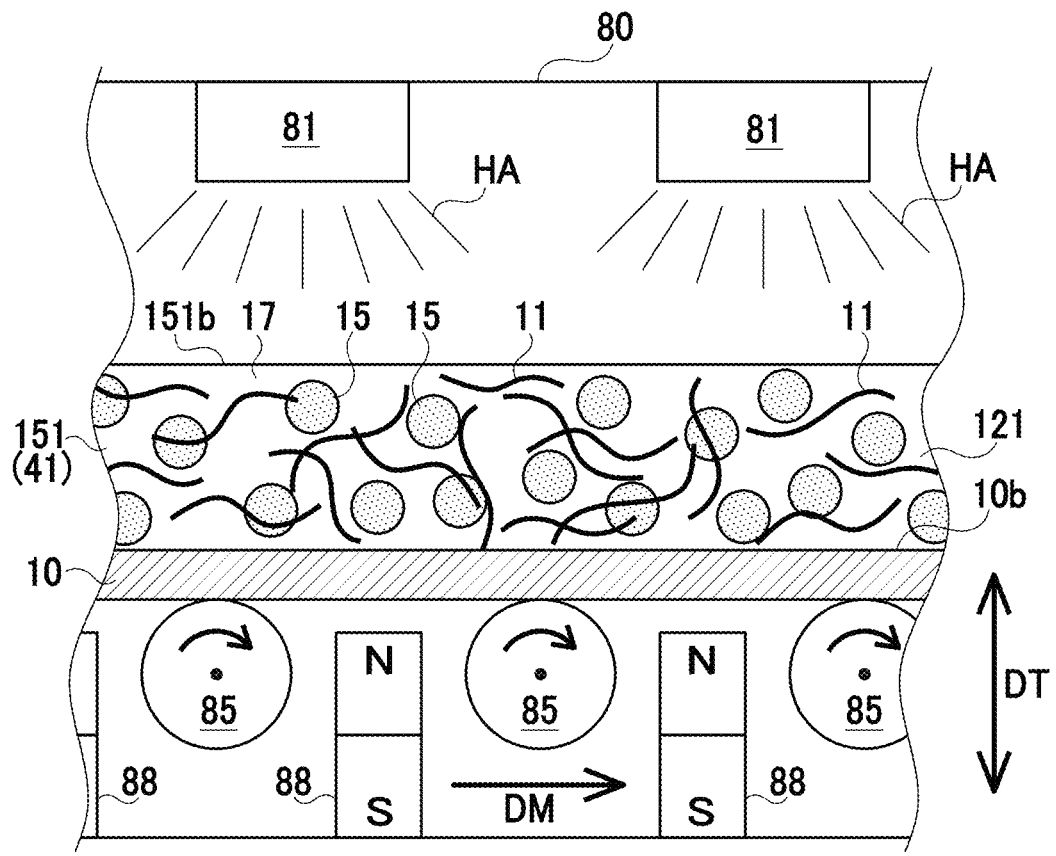
FIG. 9 is an explanatory view of a first drying step in the drying process in the example 2.
Figure 11:
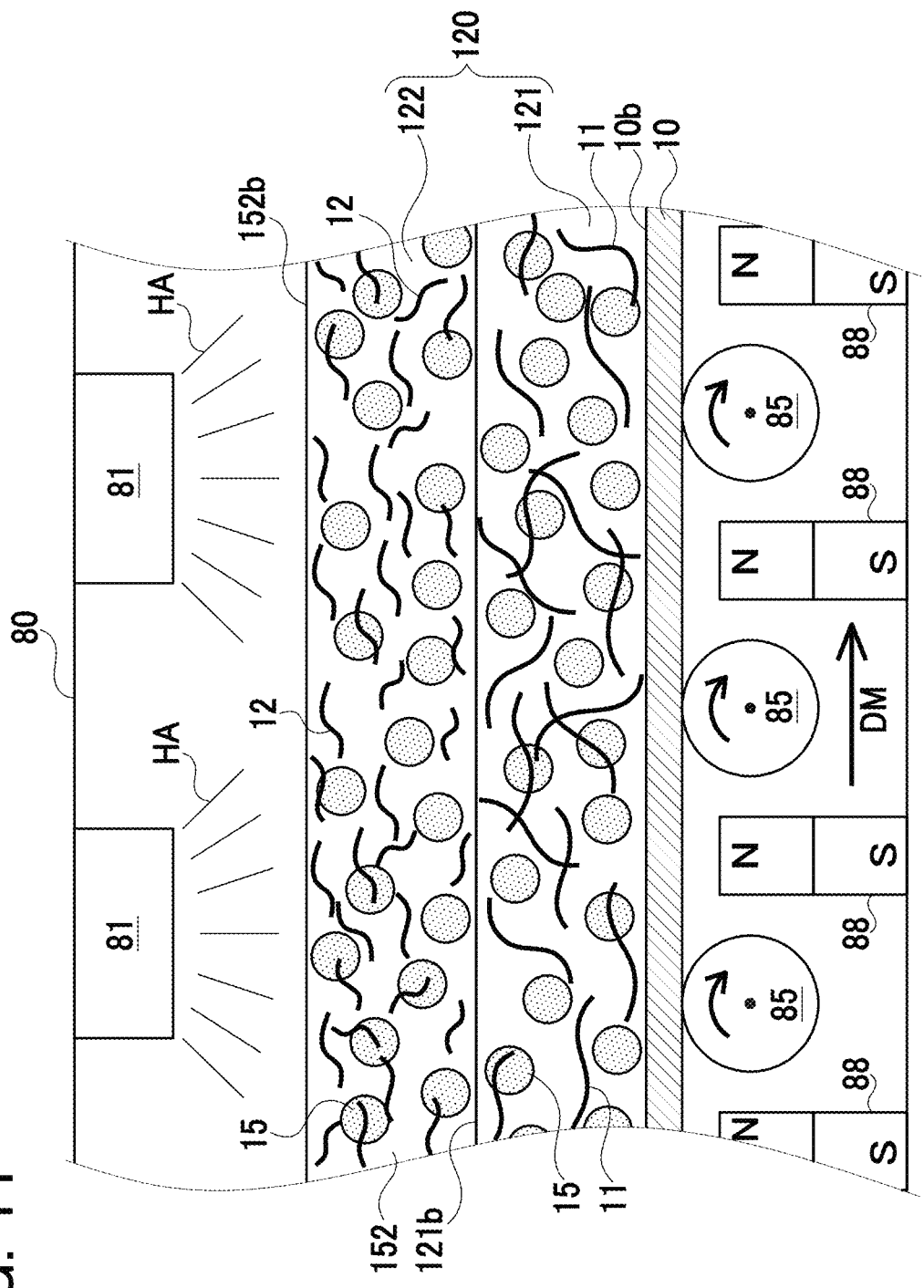
FIG. 11 is an explanatory view of a second drying step in the drying process in the example 2.

Also in the present example 2, CNTs having the characteristics of being attracted by the magnets 88 are used as the first CNTs 11 and the second CNTs 12. Further, during each term of step T4 and step T8 of the first drying, the first CNTs 11 included in the first positive electrode paste layer 151 is attracted toward the current collector 10 side by the magnets 88 (see FIG. 9). Moreover, during each term of step T6 and step TA of the second drying, the second CNTs 12 included in the second positive electrode paste layer 152 is attracted toward the current collector 10 side by the magnets 88 (see FIG. 11). Specifically, as shown in FIG. 9 and FIG. 11, while the first positive electrode paste layer 151 or the second positive electrode paste layer 152 is being dried in the drying furnace 80, the first CNTs included in the first positive electrode paste layer 151 or the second CNTs 12 included in the second positive electrode paste layer 152 are attracted toward the current collector 10 side (that is, a lower side in FIG. 9 and FIG. 11) by the magnets 88 in the drying furnace 80.

Accordingly, during the first drying step, the first CNTs 11 which are trying to move toward the surface 151b side of the first positive electrode paste layer 151 with the solvent 17, are attracted toward the current collector 10 side so that the first CNTs 11 are difficult to move toward the surface 151b side. As a result of this, the first CNTs 11 positioned on the current collector 10 side in the first positive electrode paste layer 151, especially the first CNTs 11 contacted with the current collector 10, can be prevented from moving toward the surface 151b side with the solvent 17 and thus prevented from relatively decreasing. Furthermore, during the second drying, the second CNTs 12, which are trying to move toward the surface 152b side of the second positive electrode paste layer 152 with the solvent 17, are attracted toward the current collector 10 side so that the second CNTs 12 are difficult to move toward the surface 152b side. Therefore, the second CNTs 12 positioned on the current collector 10 side in the second positive electrode paste layer 152 can be prevented from moving toward the surface 152b side with the solvent 17 and thus prevented from relatively decreasing.

In the present example 2, too, as similar to the example 1, the average length of the first CNTs 11 included in the first positive electrode paste 41 is arranged to be longer than the average length of the second CNTs 12 included in the second positive electrode paste 42. Thus, when the first positive electrode paste layer 151 is dried in step T4 and step T8 of the first drying, the first CNTs 11 positioned on the current collector 10 side in the first positive electrode paste layer 151 are hard to move to the surface 151b side (that is, the side far away from the current collector 10 or the upper side in FIG. 9) with the solvent 17, so that the first CNTs 11 positioned on the current collector 10 side, especially the ones contacted with the current collector 10, rarely decrease.

Therefore, according to the producing method of the present example 2, reduction in the conductive paths on the current collector 10 side in the positive electrode mixture layer 120 (that is, the first positive electrode mixture layer 121 and the second positive electrode mixture layer 122) can be prevented. Thus, increase in the electrical resistivity of the positive electrode plate 101 in the thickwise direction DT can be prevented, thereby preventing degradation in the current collecting performance of the positive electrode plate 101. Therefore, according to the producing method of the present example 2, the positive electrode plate 101 having low electrical resistivity (Ω·cm) in the thickwise direction DT can be produced.

Example 3

In comparing with the producing method of the example 1, a producing method of an example 3 is different in a manner that the attraction of the first CNTs 11 and the second CNTs 12 by the magnets 88 is not performed in the drying process in step S5 and step S8, but instead the first CNTs 11 and the second CNTs 12 respectively included in the first positive electrode paste layer 51 and the second positive electrode paste layer 52 are attracted toward the current collector 10 side by the magnets 88 directly before the drying process. Other configurations are similar to those of the example 1. Specifically, in the example 3, directly before the to-be-dried object TD1 including the first positive electrode paste layer 51 and the second positive electrode paste layer 52 is put in the drying furnace, the first CNTs 11 and the second CNTs 12 respectively included in the first positive electrode paste layer 51 and the second positive electrode paste layer 52 are attracted toward the current collector 10 side by the magnets 88.

Herein, the magnets 88 are disposed below the to-be-dried object TD1 which is to be conveyed into the drying furnace in the feeding direction DM. Thus, the first CNTs 11 and the second CNTs 12 respectively included in the first positive electrode paste layer 51 and the second positive electrode paste layer 52 are attracted toward the current collector 10 side by the magnets 88 directly before the to-be-dried object TD1 is conveyed into the drying furnace. Subsequently, the drying process to dry this to-be-dried object TD1 by use of a drying furnace (not shown), which is different from the drying furnace 80 only in a manner that the furnace is not provided with the magnets 88, is performed.

Accordingly, the example 3 can achieve increase in the first CNTs 11 and the second CNTs 12 positioned on the current collector 10 side in the first positive electrode paste layer 51 and the second positive electrode paste layer 52 by way of attracting the first CNTs 11 and the second CNTs 12 toward the current collector 10 side directly before the drying process. As a result of this, it is possible to prevent the first CNTs 11 and the second CNTs 12 positioned on the current collector 10 side from relatively decreasing even if the first CNTs 11 and the second CNTs 12 move toward the surface 51b side and the surface 52b side (that is, sides far away from the current collector 10) with the solvent 17 in the first positive electrode paste layer 51 and the second positive electrode paste layer 52 when the first positive electrode paste layer 51 and the second positive electrode paste layer 52 are dried in the drying process. Therefore, the producing method of the example 3 can also achieve production of a positive electrode plate having the low electrical resistivity in the thickwise direction DT.

Example 4

In comparing with the producing method of the example 2, a producing method of an example 4 is different in a manner that the attraction of the first CNTs 11 and the second CNTs 12 by the magnets 88 is not performed during the drying process in steps T4, T6, T8, and TA, but instead the first CNTs 11 included in the first positive electrode paste layer 51 and the second CNTs 12 included in the second positive electrode paste layer 52 are attracted toward the current collector 10 side by the magnets 88 directly before the drying process. Other configurations are similar to those of the example 2. Specifically, in the example 4, directly before the first positive electrode paste layer 151 is dried in the drying furnace, the first CNTs 11 included in the first positive electrode paste layer 151 are attracted toward the current collector 10 side by the magnets 88. Subsequently, the first drying is performed to dry the first positive electrode paste layer 151 by use of a drying furnace which is different from the drying furnace 80 only in a manner that the furnace is not provided with the magnets 88. Further, directly before the second positive electrode paste layer 152 is dried in the drying furnace, the second CNTs 12 included in the second positive electrode paste layer 152 are attracted toward the current collector 10 side by the magnets 88. Subsequently, the second drying is performed to dry the second positive electrode paste layer 152 by use of the drying furnace which is different from the drying furnace 80 only in a manner that the furnace is not provided with the magnets 88.

Accordingly, the example 4 can achieve increase in the first CNTs 11 positioned on the current collector 10 side in the first positive electrode paste layer 151 by way of attracting the first CNTs 11 toward the current collector 10 side directly before the first drying. As a result of this, the first CNTs 11 positioned on the current collector 10 side can be prevented from relatively decreasing even if the first CNTs 11 move toward the surface 151b side (that is, a side far away from the current collector 10) with the solvent 17 in the first positive electrode paste layer 151 when the first positive electrode paste layer 151 is dried in the first drying. Furthermore, the example 4 can achieve increase in the second CNTs 12 positioned on the current collector 10 side in the second positive electrode paste layer 152 by way of attracting the second CNTs 12 toward the current collector 10 side directly before the second drying. As a result of this, the second CNTs 12 positioned on the current collector 10 side can be prevented from relatively decreasing even if the second CNTs 12 move toward the surface 152b side (that is, a side far away from the current collector 10) with the solvent 17 in the second positive electrode paste layer 152 when the second positive electrode paste layer 152 is dried in the second drying. Therefore, the producing method of the example 4 can achieve production of a positive electrode plate having the low electrical resistivity in the thickwise direction DT.

Example 5

In comparing with the producing method of the example 1, a producing method of an example 5 is different only in a manner that a third positive electrode paste including both the first CNTs 11 and the second CNTs 12 is coated on the current collector 10, and other configurations are mostly similar to those in the example 1. Specifically, in the example 5, the third positive electrode paste including the first CNTs 11, the second CNTs 12, the positive active material particles 15, the binder, and the solvent 17 is prepared in the positive electrode paste preparing process. Herein, the first CNTs 11 and the second CNTs 12 are included at the same proportion. Further, a weight ratio of the CNTs (that is, both the first CNTs 11 and the second CNTs 12), the positive active material particles 15, the binder, and the solvent 17 in the third positive electrode paste is arranged to be as similar to the one in the first positive electrode paste 41. The third positive electrode paste is coated on the first surface 10b or the second surface 10c of the current collector 10 in the coating process to form a third positive electrode paste layer on the first surface 10b or the second surface 10c of the current collector 10.

Further, in the drying process, the third positive electrode paste layer is dried by use of the drying furnace 80 as similar to the example 1, and thus the positive electrode mixture layer is formed on the first surface 10b or the second surface 10c of the current collector 10. Thus, a positive electrode plate including the positive electrode mixture layers on both surfaces (that is, the first surface 10b and the second surface 10c) of the current collector 10 is produced. Thereafter, this positive electrode plate is pressed in the thickwise direction in the press process, thereby completing the positive electrode plate.

In the present example 5, the first CNTs 11 and the second CNTs 12 included in the third positive electrode paste layer are attracted toward the current collector 10 side by the magnets 88 in the drying furnace 80 in the drying process. Thus, the first CNTs 11 and the second CNTs 12, which tend to move toward the surface side of the third positive electrode paste layer with the solvent 17 are attracted toward the current collector 10 side, and thus the first CNTs 11 and the second CNTs 12 are difficult to move toward the surface side in the drying process. Accordingly, the first CNTs 11 and the second CNTs 12 positioned on the current collector 10 side in the third positive electrode paste layer can be prevented from moving toward the surface side with the solvent and thus prevented from relatively decreasing. Therefore, the producing method of the present example 5 can also achieve production of a positive electrode plate having the low electrical resistivity in the thickwise direction.

Example 6

In comparing with the producing method of the example 5, a producing method of an example 6 is different only in a manner that the attraction of the first CNTs 11 and the second CNTs 12 by the magnets 88 in the drying process is not performed, but directly before drying process, the first CNTs 11 and the second CNTs 12 included in the third positive electrode paste layer are attracted toward the current collector 10 side by the magnets 88, and other configurations are similar to the ones in the example 5.

In the present example 6, directly before the drying process, the first CNTs 11 and the second CNTs 12 are attracted toward the current collector 10 side so that the first CNTs 11 and the second CNTs 12 positioned on the current collector 10 side in the third positive electrode paste layer can be increased. Thus, it is possible to prevent the first CNTs 11 and the second CNTs 12 positioned on the current collector 10 side from relatively decreasing even if the first CNTs 11 and the second CNTs 12 move toward the surface side (that is, a side far away from the current collector 10) with the solvent 17 in the third positive electrode paste layer when the third positive electrode paste layer is dried in the drying process. Accordingly, the producing method of the present example 6 can also achieve production of a positive electrode plate having the low electrical resistivity in the thickwise direction.

Comparative Example 1

In comparing with the producing method of the example 2, a producing method of a comparative example 1 is different only in a manner that drying of the first positive electrode paste layer 51 or the second positive electrode paste layer 52 is performed without performing attraction of the first CNTs 11 or the second CNTs 12 by the magnets 88 during the drying process, and other configurations are similar to the ones in the example 2 in producing a positive electrode plate.

Comparative Example 2

In comparing with the producing method of the example 5, a producing method of a comparative example 2 is different only in a manner that the drying of the third positive electrode paste layer is performed without performing the attraction of the first CNTs 11 and the second CNTs 12 by the magnets 88 during the drying process, and other configurations are similar to the ones in the example 5 in producing a positive electrode plate.

<Comparison of Electrical Resistivity of Positive Electrode Plates in Thickwise Direction>

The electrical resistivity (Ω·cm) in the thickwise direction DT is measured for the positive electrode plate in each of the examples 1 to 6 and the comparative examples 1 and 2. The measurement is made by measuring the electrical resistivity of the respective positive electrode plates in the thickwise direction DT by a known method in a state in which a load of 3.5 kN is applied to the positive electrode plates in the thickwise direction DT. Results of this measurement are indicated in FIG. 13 for comparison.

Figure 13:
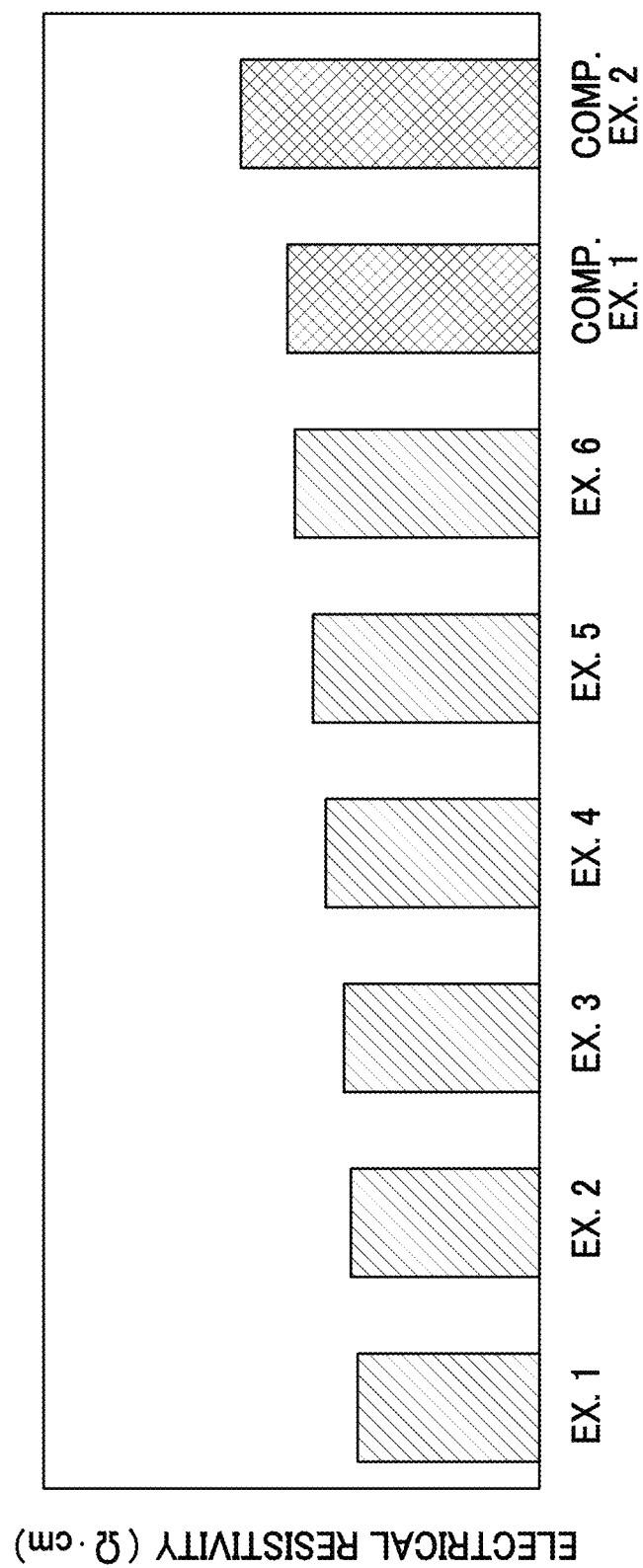
FIG. 13 is a graph for comparing electrical resistivity of the positive electrode plate in a thickwise direction.

As shown in FIG. 13, the results in the examples 1 to 6 represent lower electrical resistivity of the positive electrode plate in the thickwise direction than that of the comparative examples 1 and 2. This is because, in the examples 1 to 6, the CNTs included in the positive electrode paste layers are attracted toward the current collector 10 side by the magnets 88 directly before the drying process or during the drying process, which is different from the comparative examples 1 and 2. Thus, when the positive electrode paste layer is dried in the drying process, the CNTs disposed on the current collector 10 side in the positive electrode paste layers can be prevented from moving toward the surface side (that is, the side far away from the current collector 10) with the solvent 17 and thus prevented from relatively decreasing.

Especially, the producing method of the example 2 is different from the producing method of the comparative example 1 only in a manner that the attraction of the first CNTs 11 or the second CNTs 12 by the magnets 88 is performed during the drying process, and the positive electrode plate in the example 2 has its electrical resistivity in the thickwise direction being largely lowered as compared with the positive electrode plate in the comparative example 1. Further, the producing method of the example 5 is different from the producing method of the comparative example 2 only in a manner that the attraction of the first CNTs 11 and the second CNTs 12 by the magnets 88 is performed during the drying process, and the positive electrode plate in the example 5 has its electrical resistivity in the thickwise direction being largely lowered as compared with the positive electrode plate in the comparative example 2. These results represent that the attraction of the CNTs included in the positive electrode paste layer toward the current collector 10 side by the magnets 88 directly before the drying process or during the drying process can achieve decline in the electrical resistivity of the positive electrode plate in the thickwise direction.

Further, according to comparison of results in the examples 1 and 2 with the result of the example 5, the results in the examples 1 and 2 show decline in the electrical resistivity of the positive electrode plate in the thickwise direction as compared with the result of the example 5. This is because the examples 1 and 2 are different from the example 5 in a manner that the coating process is divided into two steps of the first coating process and the second coating process and that the first positive electrode paste 41, which includes only the first CNTs 11 having the average length longer than that of the second CNTs 12 as the CNTs, is coated on both the first surface 10*b* and the second surface 10*c* of the current collector 10 in the above-mentioned first coating process. Thus, when the first positive electrode paste layer 51 and the first positive electrode paste layer 151 formed of the first positive electrode paste 41 are dried, the first CNTs 11 positioned on the current collector 10 side in the first positive electrode paste layers 51 and 151 are hard to move toward the surface 51*b* side and the surface 151*b* side with the solvent 17, so that the first CNTs 11 positioned on the current collector 10 side, especially the ones contacted with the current collector 10 rarely decrease.

To be more specific, when the first positive electrode paste layers 51 and 151 are dried, the first CNTs 11 in the first positive electrode paste layers 51 and 151 tend to move to the surface 51*b* side and the surface 151*b* side with the solvent 17, which is to be evaporated, but the first CNTs 11 each having the long length are easily caught or hooked on the positive active material particles 15 and get hard to move to the surface 51*b* side and the surface 151*b* side owing to this catching by the positive active material particles 15. Thus, it is considered that decrease in the CNTs on the current collector 10 side are restrained. Accordingly, it is considered that the conductive paths on the current collector 10 side in the positive electrode mixture layer 20 are preferably formed, and thereby the electrical resistivity of the positive electrode plate in the thickwise direction can be made low.

On the other hand, in the example 5, the third positive electrode paste including not only the first CNTs 11 but also the second CNTs having the short average length is coated on the first surface 10*b* and the second surface 10*c* of the current collector 10. Accordingly, it is considered that, when the third positive electrode paste layer formed of the third positive electrode paste is dried, the second CNTs 12 disposed on the current collector 10 side in the third positive electrode paste layer easily move to the surface side with the solvent 17, so that the second CNTs 12 positioned on the current collector 10 side, especially the ones contacted with the current collector 10 are easily reduced. Therefore, the conductive paths on the current collector 10 side in the positive electrode mixture layer is reduced more than the ones in the examples 1 and 2, and thus the electrical resistivity of the positive electrode plate in the thickwise direction is considered to rise.

As explained in detail above, the producing method of the examples 1 and 2 can achieve decrease in the electrical resistivity of the positive electrode plate in the thickwise direction further preferably than in the producing method of the example 5. Accordingly, the producing method of the positive electrode plate in which "the coating process is divided into two processes of the first coating process and the second coating process, the first positive electrode paste including only the first CNTs having the average length longer than that of the second CNTs as the CNTs is coated on the surface of the current collector in the first coating process to form the first positive electrode paste layer on the surface of the current collector, and the second positive electrode paste is coated on the surface of the first positive electrode paste layer or on the surface of the first positive electrode mixture layer which is formed by drying the first positive electrode paste layer in the second coating process to form the second positive electrode paste layer," is further preferable.

Moreover, in comparing the results of the example 1 and the example 2, the electrical resistivity in the thickwise direction DT is lower in the example 1 than in the example 2 (see FIG. 13). The reason for this is considered as below. In the example 1, in step S4 of the second coating process, the second positive electrode paste 42 is coated on the surface 51*b* of the first positive electrode paste layer 51 before drying, and thereafter, in step S5 of the drying process, the second positive electrode paste layer 52 is dried with the first positive electrode paste layer 51. On the other hand, in the example 2, the first positive electrode paste layer 151 is dried before coating the second positive electrode paste 42, and then the first positive electrode mixture layer 121 is formed. Thereafter, the second positive electrode paste layer 152 coated on the surface 121b of the first positive electrode mixture layer 121 is dried.

To be more specific, in the example 1 and the example 2, when the second positive electrode paste layer 52 and the second positive electrode paste layer 152 are dried, a part of the second CNTs 12 positioned on the current collector 10 side in each of the second positive electrode paste layers 52 and 152 moves to the surface 52b side and the surface 152b side with the solvent 17, so that the number of the second CNTs 12 on the current collector 10 side in the second positive electrode paste layers 52 and 152 decreases.

On the other hand, in the example 1, the second positive electrode paste layer 52 is dried with the first positive electrode paste layer 51. While these layers are being dried, a part of the first CNTs 11 positioned on the surface 51b side of the first positive electrode paste layer 51 moves to the surface 52b side with the solvent 17 to be positioned on the current collector 10 side of the second positive electrode paste layer 52. Further, another part of the first CNTs 11 is positioned to bridge over the surface 51b side of the first positive electrode paste layer 51 and the current collector 10 side of the second positive electrode paste layer 52. In this manner, on the current collector 10 side of the second positive electrode paste layer 52, the first CNTs 11 are disposed to supplement at least a part of the reduced amount of the second CNTs 12. Thereby, in the example 1, the carbon nanotubes are disposed appropriately also on the current collector 10 side of the second positive electrode paste layer 52, so that the electrical resistivity of the positive electrode plate 1 in the thickwise direction DT is lowered.

On the other hand, in the example 2, when the second positive electrode paste layer 152 is dried, the first positive electrode paste layer 151 has already been dried and turned to the first positive electrode mixture layer 121, and thus the first CNTs 11 in the first positive electrode mixture layer 121 do not move to the second positive electrode paste layer 152. Therefore, when the second positive electrode paste layer 152 is dried, the number of the carbon nanotubes on the current collector 10 side of the second positive electrode paste layer 152 decreases by the amount of the second CNTs 12 that have moved toward the surface 152b side.

As explained above, the producing method of the example 1 can further lower the electrical resistivity of the positive electrode plate in the thickwise direction than the producing method of the example 2. Accordingly, the producing method for the positive electrode plate "in which the second positive electrode paste layer is formed by coating the second positive electrode paste on the surface of the first positive electrode paste layer in the second coating process and the first positive electrode paste layer is dried with the second positive electrode paste layer in the drying process" is further preferable.

The present disclosure has been explained in detail with embodiments as the examples 1 to 6 mentioned above, but the present disclosure is not limited to the above embodiments and may be applied with any appropriate modifications without departing from the scope of the disclosure.

REFERENCE SIGNS LIST 1, 101 Positive electrode plate
10 Current collector
11 First carbon nanotubes (first CNTs)
12 Second carbon nanotubes (second CNTs)
15 Positive active material particles
17 Solvent
20, 120 Positive electrode mixture layer
21, 121 First positive electrode mixture layer
22, 122 Second positive electrode mixture layer
41 First positive electrode paste
42 Second positive electrode paste
51, 151 First positive electrode paste layer
52, 152 Second positive electrode paste layer
80 Drying furnace
88 Magnets

What is claimed is:

1. A producing method for a positive electrode plate comprising a positive electrode mixture layer on a surface of a current collector includes:
    positive-electrode-paste preparing of preparing a positive electrode paste including carbon nanotubes, positive active material particles, and a solvent;
    coating of coating the positive electrode paste on the surface of the current collector to form a positive electrode paste layer on the surface of the current collector; and
    drying of drying the positive electrode paste layer to form the positive electrode mixture layer, wherein
        the carbon nanotubes have the characteristics of being attracted by a magnet, and
        the magnet attracts the carbon nanotubes included in the positive electrode paster layer toward a side of the current collector at least any one of directly before the drying and during the drying.

2. The producing method of the positive electrode plate according to claim 1, wherein
    the carbon nanotubes comprise first carbon nanotubes and second carbon nanotubes, an average length of which is shorter than an average length of the first carbon nanotubes,
    the positive-electrode-paste preparing is to prepare a first positive electrode paste including the first carbon nanotubes as the carbon nanotubes and a second positive electrode paste including the second carbon nanotubes as the carbon nanotubes,
    the coating includes:
        first coating of coating the first positive electrode paste on the surface of the current collector to form a first positive electrode paste layer on the surface of the current collector; and
        second coating of coating the second positive electrode paste on any one of a surface of the first positive electrode paste layer and a surface of a first positive electrode mixture layer, which is formed by drying the first positive electrode paste layer, to form a second positive electrode paste layer, and
    attracting by the magnet is performed at least any one of before drying the first positive electrode paste layer in the drying and during drying the first positive electrode paste layer in the drying.

3. The producing method for the positive electrode plate according to claim 2, wherein
    the second coating is to coat the second positive electrode paste on the surface of the first positive electrode paste layer to form the second positive electrode paste layer, and the drying is to dry the first positive electrode paste layer with the second positive electrode paste layer to form the positive electrode mixture layer after the second coating.

* * * * *